July 5, 1955     A. N. CLOUGH     2,712,477

VEHICLE AXLE PRESSURE RELIEF

Filed Oct. 31, 1952

INVENTOR.
A. N. Clough

BY

ATTORNEY

United States Patent Office 2,712,477
Patented July 5, 1955

2,712,477

VEHICLE AXLE PRESSURE RELIEF

Alfred N. Clough, Inglewood, Calif.

Application October 31, 1952, Serial No. 317,906

7 Claims. (Cl. 308—16)

This invention relates to improvements in power transmitting devices such as shafts and axles of vehicles such as automobiles as well as in the housings for such shafts and axles.

It is the general object of the invention so to design and construct such devices that vibrations and jolts, caused by irregular operating conditions of the vehicles, may be substantially eliminated. It is a further object to provide devices of the character referred, designed and constructed to eliminate excessive wear on parts associated therewith when subjected to abnormal operating conditions.

These and other objects of the invention, as well as the advantageous features thereof, will be better understood from the following detailed description and by referring to the accompanying drawing in which preferred forms of the invention are illustrated.

Figure 1:
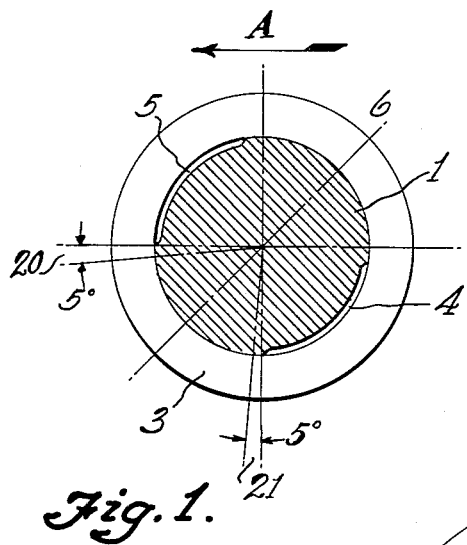
Fig. 1 is an end view of a shaft or axle embodying the invention and indicating the relation thereof to its bearing.

Referring in the first instance to Fig. 1, it is to be noted that the numeral 1 designates a stationary shaft or axle on which a bearing 3 is mounted to rotate. The type of bearing employed would depend upon the kind of machine it is designed to serve. In the peripheral surface of the shaft or axle are shown sunk recesses 4, 5 which extend a distance along the surface of the shaft or axle in opposite directions. It is important to note that the recess 4 extends from the vertical center line of the shaft or axle, at the bottom thereof, in counter-clockwise direction to a point nearer the horizontal center line thereof and that the recess 5 extends from the opposite end of this horizontal center line upwardly to a point nearer the vertical center line of the shaft or axle. It is to be understood that, in order to be able more clearly to describe the effect of these recesses on the bearing supported by the shaft or axle, the depth of the recesses has been greatly exaggerated and it is pointed out that this depth ordinarily is required to be no more than about .005 to .006 of an inch. In order to simplify the following description, reference is had to the axle of a vehicle but it is to be understood that it applies equally to any other type of shaft.

Figure 2:
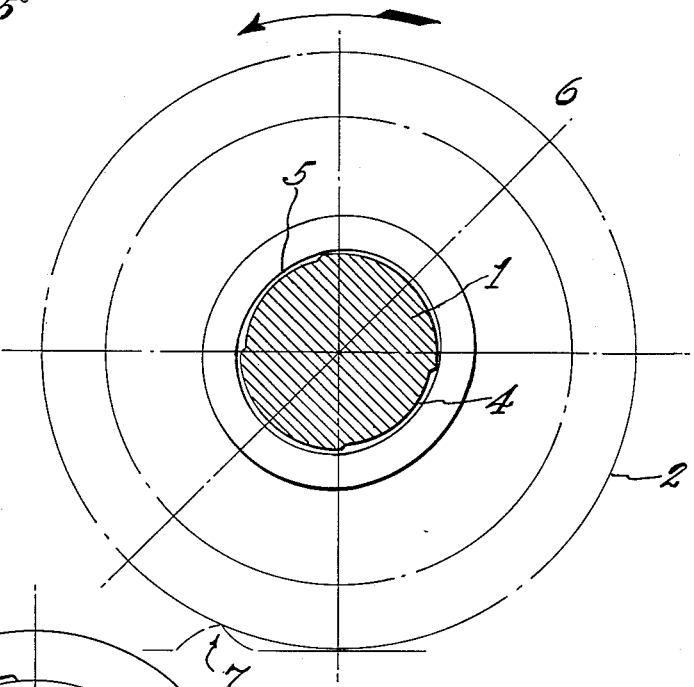
Fig. 2 shows the device of the invention as applied to the wheel of a vehicle and it is added to indicate the manner in which the device functions when the wheels of the vehicle encounter an obstruction in the road surface.

While the vehicle is at rest or normally moving in forward direction as indicated by the arrow A, the recessing of the axle in the above described manner will have no effect on the bearing 4 or the operation of the vehicle. This is due to the fact that the vertical pressure exerted by the weight of the vehicle and the horizontal pressure due to the momentum of the moving vehicle result in a forwardly directed pressure substantially 45° to the vertical and horizontal axes of the axle, in a forward direction, as indicated by the line 6 of Fig. 1. Should, however, the axle supporting wheel 2 suddenly encounter an obstruction in the roadway, such as indicated in 7 at Fig. 2, it is found that the greatly multiplied pressure to which the wheel becomes subjected, results in a distortion of the bearing, substantially as indicated in Fig. 2. It is found that the diameter of the bearing along the line 6 becomes lengthened and that in so stretching the diameter of the bearing at right angles thereto becomes shortened, causing the inner surfaces of the bearing to be drawn into the recesses 4, 5. In the conventional types of bearings, where the recesses of the invention are not provided, it is found that such distortion of the bearing causes the inner surface thereof, at right angles to the line 6, to exert sufficient pressure against the axle to produce a sudden, excessive braking of the wheel and that this braking action is converted into the jolt usually felt by the occupants of the vehicle. But, as stated, where the recesses are provided in the surface of the axle, it has been established by numerous road tests over a long period of time that such braking action is eliminated and the vehicle can ride over the obstructions in the roadway without transfer of the shock from the wheel to the vehicle.

Figure 3:
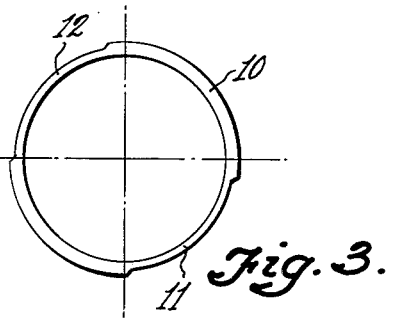
Fig. 3 shows a somewhat modified form of the invention.

While the recessing of the axle, as above described has been found entirely satisfactory, it may in some cases be found preferable not to recess the axle but to mount thereon a sleeve having in the outer surface thereof recesses corresponding to the recesses of the axle in Fig. 1. Such sleeve is indicated at 10 in Fig. 3 and the recesses 11, 12 would be sunk into the periphery thereof in the same relation to the vertical and horizontal axes through the center of the sleeve and of substantially the same depth. When such sleeve is adopted it may be found easier and more economical to fit vehicles which already are in operation with the shock eliminating devices of the invention.

Figure 4:
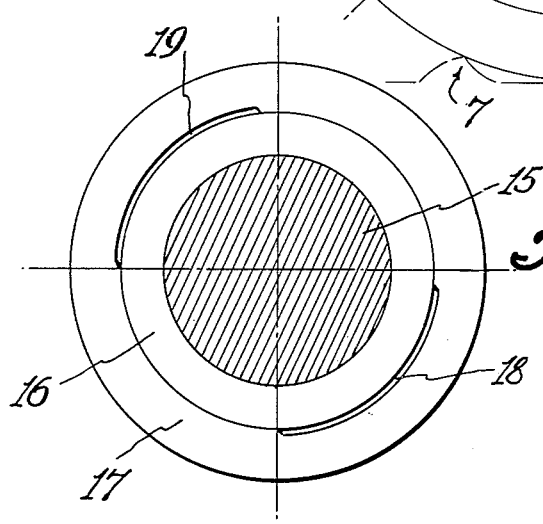
Fig. 4 illustrates the manner in which the device of the invention may be embodied in the bearing housing of a shaft or axle.

In the combination of Fig. 4, the numeral 15 denotes a rotating axle which is mounted within a bearing 16 and this bearing is, in turn, supported within a housing 17, such as ordinarily used to support the rotation transmitting rear axle of a self-propelled vehicle. For the purpose of this combination, it is found that the recesses 18, 19 must be sunk into the inner surface of the housing 17 and it is important to note that they will assume the same position relative to the vertical and horizontal axes of the bearing support that the recesses 4 and 5 take relative to the axes of the axle, but in all other respects this method of shock relief remains substantially as above described.

The distances that the recesses 4, 5 extend from the vertical and horizontal axes of the shaft would depend on the speed at which the vehicle normally is operated. In slow moving vehicles, the recesses would extend nearly ninety degrees from the vertical and horizontal axes, but the distance would gradually decrease until, in vehicles designed for high speed, the recesses may not extend more than about forty five degrees. Experience has also taught me that in high speed vehicles, it is preferable to commence the recess 5 a short distance below the horizontal axis, substantially as indicated at 20, in Fig. 1. The start of the recess 4 would, in such case, commence a short distance ahead of the vertical axis, as indicated at 21.

Other modifications, within the scope of the claims hereto appended, may be embodied without departing from the spirit of the invention.

I claim:

1. The combination of a stationary shaft and a bearing rotatable thereon, the shaft having diametrically opposed recesses in the peripheral surface thereof, one recess rising from the bottom of the shaft along an arc of less than ninety degrees in one direction, the other recess rising from the horizontal plane through the center of the shaft along an arc of less than ninety degrees in the opposite direction.

2. The combination of a shaft mounted for rotation within a housing, the housing having diametrically opposed recesses in the inner bearing surface thereof, one rising from the bottom of the housing along an arc of less than ninety degrees in one direction, the other recess rising from the horizontal plane through the housing less than ninety degrees in the opposite direction.

3. The combination of a stationary shaft and a bearing fitted to rotate in counter-clockwise direction thereon, the shaft having a recess in the periphery thereof starting at the bottom of the vertical axis through the center of the shaft and rising in counter-clockwise direction to a point nearer the horizontal axis through the shaft center, the shaft having a second recess in the periphery thereof starting at the opposite end of said horizontal axis and rising in clockwise direction nearly to the top of the shaft.

4. The combination of a counter-clockwise rotatory shaft and a stationary housing therefor, the housing having in the inner peripheral surface diametrically opposed recesses, one recess rising from the bottom of the housing surface counter-clockwise through an arc shorter than ninety degrees, the other recesses rising counter-clockwise from a horizontal plane through the center of the housing through an arc shorter than ninety degrees.

5. The combination of a shaft and its bearing, there being in the adjacent surface of one of said parts sunk recesses rising from the vertical and horizontal center lines thereof in opposite directions.

6. A shaft and bearing adapted to transmit movement in a horizontal direction, there being sunk in the adjacent surface of one of said parts diametrically opposed recesses on a diameter forwardly inclined relative to the horizontally directed movement of the parts.

7. The combination of a shaft and its bearing, there being in the adjacent surface of one of said parts sunk recesses rising from the vertical and horizontal center lines thereof in opposite directions, the length of each recess being about forty five degrees.

References Cited in the file of this patent

UNITED STATES PATENTS 1,674,317 Buff ------------------ June 19, 1928